United States Patent [19]

Goswami

[11] 4,031,045

[45] June 21, 1977

[54] FOAMABLE PVC RESIN FORMULATION, PROCESS FOR FOAMING, AND PRODUCT THEREOF

[75] Inventor: Jagadish Chandra Goswami, New City, N.Y.

[73] Assignee: Stauffer Chemical Company, Westport, Conn.

[22] Filed: July 28, 1976

[21] Appl. No.: 709,562

[52] U.S. Cl. .......................... 260/2.5 R; 260/2.5 P; 260/23 EP; 260/30.4 R; 260/31.8 R; 526/278
[51] Int. Cl.$^2$ ........................................... C08J 9/10
[58] Field of Search ....... 260/2.5 P, 2.5 R, 2.5 HA; 526/278

[56] References Cited

UNITED STATES PATENTS 3,691,127   9/1972   Kraft et al. .................... 260/29.6 T
3,943,085   3/1976   Kraft et al. ................. 260/29.6 MP Primary Examiner—Morton Foelak
Attorney, Agent, or Firm—Richard P. Fennelly

[57] ABSTRACT

A foamable polyvinyl chloride (PVC) resin formulation containing (1) a copolymer formed by emulsion polymerizing from about 70% to about 90% vinyl chloride, from about 5% to about 15% vinyl acetate and from about 5% to about 15% of a bis(hydrocarbyl)vinylphosphonate; (2) a polyester or epoxy plasticizer (or mixture thereof) and (3) 4,4'-oxybis (benzene sulfonyl hydrazide) is foamed to form a product having a smooth unblistered surface, good cell quality and medium density. The foaming can take place at a temperature of from about 320° F. (160° C.) to about 400° F. (204° C.) for a period of time of from about 6 to about 20 minutes.

8 Claims, No Drawings

FOAMABLE PVC RESIN FORMULATION, PROCESS FOR FOAMING, AND PRODUCT THEREOF

BACKGROUND OF THE INVENTION

1. Field of the Invention

The present invention pertains to a foamable PVC resin formulation and a process of foaming. The product of the invention is useful as a gasket material for acrylic taillights.

2. Description of the Prior Art

Gasket materials formed from foamed PVC formualtions which are adapted to be used adjacent acrylic taillights in autombiles and trucks cannot contain any plasticizer which will exert a solvating effect on the acrylic material forming the taillight. It has been common for the automotive industry to therefore avoid the use of such common polyvinyl chloride plasticizers as the phthalates or phosphates which do exert such a solvating effect. Two classes of plasticizer which are useful in such foamed products are the polyester and epoxy plasticizers. It has been common for PVC homopolymers to be used in prior art foamable formulations in combination with such plasticizers and with a nitroso blowing agent (e.g., N,N-dimethyl-N,N'-dinitrosoterephthalamide which is available in a 70%, by weight, strength in white mineral oil under the trademark "Nitrosan" from E. I. Du Pont de Nemours & Co.) Such prior art formulations can be readily foamed to form a foam having a smooth, unblistered surface and a medium foam density. However if other blowing agents are used under similar foaming conditions, e.g., azodicarbonamide blowing agents, a foamed product havng bad surface blisters is produced.

The use of such a dialkyl dinitrosoterephthalamide can cause problems. In order to get a reasonably low density foam using such blowing agents a two step process, e.g., a preliminary gelling step followed by an expansion step, is often needed. Storing of such blowing agents can also be a problem since even at room temperature the active ingredient contained in such formulations will decompose with the evolution of gas. Additionally, in foamable formulations containing basic ingredients (e.g., methylamine, ethylenediamine, alcoholic solutions of caustic soda, potash or sodium hydroxide) the active ingredient can react and evolve diazomethane. The residue of such a decomposition reaction is dimethylterephthalate which has a limited compatibility with the polyvinyl chloride foam system thereby requiring a separation procedure. A need therefore has arisen in the art for alternative blowing agent and resin systems for such applications.

SUMMARY OF THE PRESENT INVENTION

The present invention is a foamable resin formulation which can be used as a gasket material for acrylic taillights and which comprises a vinyl chloride/vinyl acetate/bis(hydrocarbyl)vinylphosphonate copolymer, a polyester or epoxy plasticizer (or mixtures thereof) and 4,4'-oxybis (benzene sulfonyl hydrazide). The invention also includes the process for foaming the formulation as well as the product formed by such a process.

DESCRIPTION OF PREFERRED EMBODIMENTS OF THE INVENTION

The first major component of the foamable formulation is a vinyl chloride/vinyl acetate/bis(hydrocarbyl)-vinylphosphonate copolymer. This copolymer is an emulsion copolymer which contains moieties derived from about 70 to about 90%, by weight, vinyl chloride, from about 5% to about 15% by weight, vinyl acetate and from about 5% to about 15%, by weight, of a bis (hydrocarbyl)vinylphosphonate of the formula

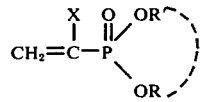

where X is selected from the group consisting of hydrogen, halogen, e.g. chlorine or bromine, cyano, phenyl and $C_1$–$C_{18}$alkyl. R and R' are hydrocarbyl groups obtained by removing a hydrogen from an aliphatic or aromatic group. Preferred groups for R and R' are the substituted and unsubstituted $C_1$–$C_{12}$ alkyl groups. The substituents on the hydrocarbyl groups, if such are present, must not interfere with the emulsion polymerizaton reaction which is used to form the copolymer. Suitable examples of non-interfering substituents are given in U.S. Pat. No. 3,943,085 to P. Kraft et al. at Col. 2, lines 60–63, which is incorporated herein by reference. A particularly preferred vinylphosphonate is bis(beta-chloroethyl)vinylphosphonate, and a particularly preferred copolymer is formed by emulsion polymerizing from about 80% to about 90%, by weight, vinyl chloride, from about 5% to about 10%, by weight, of vinyl acetate and from about 5% to about 10%, by weight of the vinylphosphonate, most preferably bis(-beta-chloroethyl)vinylphosphonate. The emulsion copolymer used in this invention has a fusion temperature of from about 260° F. (127° C). to about 300° F. (149° C.) and a relative viscosity of from about 1.6 to about 2.3 when measured as a 1% solution of the copolymer in cyclohexanone at 25° C. The copolymer used herein is formed by using conventional emulsion polymerization techniques, such as the conventional seed growth techniques.

Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts can be present in a concentration of from 0.1 to 5%, by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, sulfonate, phosphate, or sulfosuccinate salts; the alkyl aryl ether alcohols, and the alkyl aryl polyether sulfate salts. The selected emulsifier or emulsifiers can be present in a total concentration of from about 0.3 to 8%, by weight, of the total monomer charge. In addition, a protective colloid such as polyvinyl alcohol, methyl cellulose or gelatin can also, if desired, be present in the recipe in a concentration of from about 0.05 to 5%, by weight, of the total monomer charge.

The actual polymerization reaction will ordinarily be conducted at a temperature of from about 30° to 80° C. for a period of from about 6 to 24 hours, depending upon such factors as the particular monomer, catalysts, surfactant and polymerization apparatus that is being utilized. The latices resulting from this polymerization process will ordinarily have a resin solids content of from about 20 to 50%, by weight, wherein the particles range in size from about 0.02 to 2 microns.

The second major component of the foamable formulation of the present invention is a polyester plasticizer, an epoxy plasticizer or mixtures thereof. These plasticizers do not exert a solvating effect on acrylic polymers.

The polyester plasticizers which are suitable for use herein are made by reaction of (1) a dibasic acid, e.g., adipic, azelaic, lauric, or sebacic acid; (2) a glycol (dihydric) alcohol, e.g., diethylene glycol, 1,2 butanediol and neopentylene glycol; and (3), optionally, a mono-functional terminator, such as a monobasic acid and are noted for their permanence. They are usually homo- or copolyesters of the A-A-B-B type and have molecular weights in the range of about 1,000 to about 8,000, preferably about 1,000 to about 2,000. A number of prior art references discuss them in detail including U.S. Pat. Nos. 2,512,722; 2,512,723; and 2,555,062; British Pat. Nos. 690,921 and 1,032,648 and Encyclopedia of Polymer Science and Technology Vol. 11, pages 83 and 120 (references 161–165). Plasticizers of this type are available commercially under the following tradenames: "Paraplex" (Rohm and Haas Co.); "Reoplex" (Ciba-Geigy); "Hexaplas" (Imperial Chemical Industries Ltd); "Ultramoll" (Bayer); and "Santicizer" (Monsanto Co.)

Epoxy plasticizers are obtained by epoxidization of vegtable oils or fatty acids. The two major types are the epoxidized unsaturated triglycerides, e.g., soybean oil, and the epoxidized esters of unsaturated fatty acids, e.g., the butyl- octyl- or decyl esters of oleic acid. Some suitable epoxy plasticizers include epoxidized soybean oil, epoxidized sunflower oil, epoxidized linseed oil, epoxidized tallate ester, 2-ethylhexyl epoxy tallate, and octyl epoxy stearate.

The third major component of the foamable formulation of the present invention is a 4,4'-oxybis (benzene sulfonyl) hydrozide) blowing agent. A suitable blowing agent of this type is available under the tradename "Celogen OT" from Uniroyal Chemical, Division of Uniroyal, Inc.

The amount of plasticizer and blowing agent that is used in connection with the resin must be an effective amount of each for plasticization and expansion of the resin, respectively. Generally, if the amounts of the three major components is expressed in terms of weight percents of the formualtion, the resin will generally comprise from about 40% to about 60% by weight of the formulation, the plasticizer from about 40% to about 55% by weight, and the blowing agent from about 1% to about 5%, by weight.

In addition to the above amounts of the three above-enumerated major components, the foamable formulation of the present invention can also contain conventional ingredients such as fillers, pigments, viscosity depressants and stabilizers in conventional amounts. The precise amount of any of such ingredients which is used can be varied quite widely depending upon the precise type of endproduct which is desired. The foamable formulation of the present invention does not utilize an organic base or oxidizing agent activator such as is required in the invention described in applicant's copending U.S. Ser. No. 598,522 filed July 23, 1975.

The foamable formulation of the present invention can be expanded to form a product having a smooth, unblistered surface, fine to medium fine density (15 to 60 lbs./ft$^3$) (240.3 to 961.1 kg/m$^3$) and good cell quality by heating it to a temperature of from about 160° C. to about 240° C. for about 6 to about 20 minutes in conventional foaming equipment.

The Examples which follow further illustrate the present invention.

EXAMPLE 1

This Example illustrates the procedure for making the copolymer which is useful in preparing the foamable formulation of the present invention.

The first step in preparing the desired emulsion copolymer was to prepare a seed polymer from the following ingredients:

| Ingredient | Amount |
|---|---|
| Sodium lauryl sulfate ("Sipex UB", sold by Alcolac Chemical Corp., 30% solution | 12 g. |
| Sodium dioctyl sulfosuccinate ("Aerosol OT", sold by American Cyanamid Co.) | 3.3 g. |
| Dibasic sodium phosphate | 13.4 g. |
| Vinyl acetate | 2100 g. |
| Bis(beta-chloroethyl)vinyl-phosphonate | 1050 g. |
| Vinyl chloride monomer | 42 lbs. 8 oz. (19.295 kg.) |
| Deionized Water | 68 lbs. (30.872 kg.) |
| H$_2$O$_2$(30% solution of H$_2$O$_2$ in 7000 ml. H$_2$O) | 6 g. |
| Ascorbic Acid (in 2000 ml. H$_2$O) | 3 g. |
| Emulsifier Mixture | * |

* 200 g. "Sipex UB" and 37.6 g. "Aerosol OT" + water to a total volume of 2000 ml.

The procedure that was used to form the seed latex was as follows:

1. The water and dibasic sodium phosphate was charged into a 20 gallon reactor which was closed. The reactor was heated to 70° C. and evacuated. The air space was flushed with nitrogen, and the reactor was cooled to 30° C.;

2. The sodium lauryl sulfate, sodium dioctyl sulfosuccinate (beta-chloroethyl)vinylphosphonate monomers were charged into the reactor which was closed. The reactor was subjected to evacuation for 5 minutes at the end of which the vinyl chloride monomer was added;

3. The reactor was heated to 54° C.;

4. The catalyst solution of H$_2$O$_2$ and ascorbic acid was metered into the reactor at 300 cc./hour.

The solids content was taken every 30 min. At a solids content of 8% by weight the combination of sodium lauryl sulfate ("Sipex UB" and sodium dioctyl sulfosuccinate "Aerosol OT") was added at a rate of 300 cc./hr;

6. The reaction rate was controlled, such that the solids content increased at a rate of 5%, per hour, by adjusting the flows of H$_2$O$_2$ and ascorbic acid;

7. When the pressure fell to 60 psi, the vinyl chloride monomer was vented and a final solids content was taken;

8. The reactor was sparged with nitrogen for 2 hours to remove residual vinyl chloride monomer; and 9. The reactor charge was then dropped into a fiber drum through a screen.

The seed particles from Step I were then used to prepare larger emulsion particles for use in the Example which follows. The following ingredients were used:

| Ingredient | Amount |
| --- | --- |
| Seed latex | 600 g. |
| Deionized water | 68 lbs. |
| | (30.872 kg.) |
| Dibasic sodium phosphate | 13.4 g. |
| Vinyl acetate | 2100 g. |
| Bis(beta-chloroethyl)vinylphosphonate | 1040 g. |
| Vinyl chloride | 42 lbs. 8 oz. |
| | (19.295 kg.) |
| Sodium dioctyl sulfosuccinate ("Aerosol OT") | 3 g. |
| $H_2O_2$ (30% solution of $H_2O_2$ in 2000 ml. $H_2O$) | 6 g. |
| Ascorbic acid (in 2000 ml. $H_2O$) | 3 g. |
| Emulsifier Mixture | * |

* 200 g. Sipex UB + 37.6 g. Aerosol OT in water (2000 ml. total).

The procedure that was used was essentially the same as used in the first part of this Example.

EXAMPLE 2

This Example illustrates the use of the copolymer described in Example 1 with (1) 4,4'-oxybis (benzene sulfonyl hydrazide) [Formulations A and B] and (2) 4,4'-oxybis (benzene sulfonyl hydrazide) and an amine activator [Formulation C], as the blowing system. The results achieved using system (1) were far superior.

The following Table sets forth the various components (in parts by weight) used in the foam formulation:

| | Formulation | | |
| --- | --- | --- | --- |
| | A | B | C |
| Resin from Example 1 | 200 | 200 | 200 |
| Soybean oil epoxide plasticizer (G-62 from Rohm & Haas) | 190 | 200 | 190 |
| 4,4'-oxybis (benzene sulfonyl hydrazide) | 10 | 12 | 10 |
| Triethylene diamine (in ethyl amine) activator (R-8020 from Air Products & Chemicals) | — | — | 3 |
| Calcium carbonate filler ("Duramite" from Thompson, Weinman & Co.) | 30 | 30 | 30 |
| Silicone surfactant(viscosity depressant L-548 from Union Carbide) | 3 | — | 3 |
| Barium zinc stabilizer (ABC-2 from Interstate Chemical) | 4 | 4 | 4 |
| Titanium dioxide pigment | 2 | 4 | 2 |
| Calcium petronate viscosity depressant (Witco Chemical) | — | 5 | — |

The above ingredients were mixed to form a foamable formulation. Formulations A and B were heated at about 350° F. (about 177° C.) for about 8 minutes to form a gasket material. Formulation C was expanded (in separate runs) at a variety of temperatures for a variety of periods of time: (1) about 350° F. (about 177° C.) for about 8 minutes; (2) about 320° F. (about 160° C.) for about 10 minutes; (3) about 300° F. (about 150° C.) for about 10 minutes; and (4) about 280° F. (about 138° C.) for about 10 minutes. The foam quality for Formulations A, B and C. is given below.

| | Formulation | | |
| --- | --- | --- | --- |
| | A | B | C |
| Foam Surface | Smooth | Smooth | Blistered |
| Cell Structure | Medium Fine | Medium Fine | Very Coarse |
| Foam Density | | | |
| (lbs/ft³) | 28.8 | 21.6 | — |
| (kg/m³) | 461.3 | 346.0 | — |

The cell density is determined by visual inspection of the foam. A "fine" density is one wherein the walls of the individual cells are not visible to the unaided eye. A "medium-fine" density is one wherein the cell walls are just barely visible to the unaided eye.

The foregoing Examples are merely illustrative of certain preferred embodiments of the present invention and should not be construed in a limiting sense. The claims which follow set forth the scope of protection which is desired.

What is claimed:

1. A foamable resin formulation which consists essentially of:
   a. a copolymer consisting essentially of from about 70% to about 90%, by weight, of vinyl chloride, from about 5 to 15%, by weight, of vinyl acetate and about 5% to 15% by weight of a bis(hydrocarbyl)vinylphosphonate of the formula

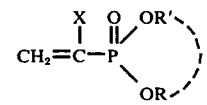

wherein X is selected from the group consisting of hydrogen, halogen, cyano, phenyl and $C_1$–$C_{18}$ alkyl and where R and R' are $C_1$–$C_{12}$ alkyl groups;
   b. an effective amount of a plasticizer selected from the group consisting of polyester plasticizers made from the reaction of a dibasic acid and dihydric alcohol, epoxy plasticizers made by the epoxidation of vegetable oils or fatty acids and mixtures thereof for plasticization of the copolymer; and
   c. an effective amount for expansion of a 4,4'-oxybis (benzene sulfonyl hydrazide) blowing agent.

2. A formulation as claimed in claim 1 wherein R and R' is a halosubstituted $C_1$–$C_8$ alkyl group.

3. A formulation as claimed in claim 1 wherein the vinylphosphonate is bis(beta-chloroethyl)vinylphosphonate.

4. A formualtion as claimed in claim 1, wherein the vinylphosphonate is bis(beta-chloroethyl)vinylphosphonate.

5. A formulation as claimed in claim 1 wherein the copolymer comprises from about 80% to about 90%, by weight, vinyl chloride, about 5% to about 10%, by weight, vinyl acetate and about 5% to about 10%, by weight, of the vinylphosphonate.

6. A formulation as claimed in claim 1 wherein the formulation contains from about 40% to about 60% by weight of the copolymer.

7. A formulation as claimed in claim 1 wherein the formulation contains about 40% to about 55% by weight of the polymeric plasticizer.

8. A formulation as claimed in claim 1 wherein the formulation contains about 1% to about 5% by weight of the blowing agent.

* * * * *